United States Patent
Kim et al.

(10) Patent No.: US 8,706,072 B2
(45) Date of Patent: Apr. 22, 2014

(54) CONTROL MESSAGE PROCESSING METHOD IN WIRELESS MESH NETWORK AND CONTROL MESSAGE PROCESSING APPARATUS USING THE METHOD

(75) Inventors: Jae Hoon Kim, Seoul (KR); Jung Ho Kim, Suwon-si (KR); Byoung-Joon Lee, Seongnam-si (KR); Yong Sung Roh, Icheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1235 days.

(21) Appl. No.: 11/802,153

(22) Filed: May 21, 2007

(65) Prior Publication Data

US 2008/0117885 A1 May 22, 2008

(30) Foreign Application Priority Data

Nov. 21, 2006 (KR) .................. 10-2006-0115347

(51) Int. Cl.
*H04B 7/212* (2006.01)
(52) U.S. Cl.
USPC ........... 455/338; 370/337; 370/351; 370/352; 370/252; 370/254; 370/255; 370/256; 370/248; 455/445
(58) Field of Classification Search
USPC ......... 370/338, 254, 310, 337, 351, 252, 255, 370/256, 248
See application file for complete search history.

(56) References Cited

U.S. PATENT DOCUMENTS

| 7,117,295 | B2* | 10/2006 | Kunori ...................... 711/103 |
| 7,602,735 | B2* | 10/2009 | Cheon et al. ............... 370/254 |
| 2003/0161268 | A1 | 8/2003 | Larsson et al. |
| 2005/0157749 | A1* | 7/2005 | Lee et al. ................... 370/466 |
| 2006/0153111 | A1* | 7/2006 | Roh et al. ................... 370/310 |
| 2007/0097892 | A1* | 5/2007 | Tsang ......................... 370/310 |
| 2007/0274232 | A1* | 11/2007 | Axelsson et al. .......... 370/254 |

FOREIGN PATENT DOCUMENTS

| KR | 1020050041294 | 5/2005 |
| KR | 1020060003401 | 1/2006 |

OTHER PUBLICATIONS

Montavont, et al., "Handover Management for Mobile Nodes in IPv6 Networks," *IEEE Communications Magazine*, Aug. 2002, pp. 38-43.
Korean Office Action issued on Jun. 20, 2012, directed to counterpart Korean Patent Application No. 10-2006-0115347; 4 pages.

* cited by examiner

*Primary Examiner* — Khalid Shaheed
(74) *Attorney, Agent, or Firm* — NSIP Law (57) ABSTRACT

A control message processing method and a control message processing apparatus using the method on a wireless mesh network are provided where a neighbor solicitation (NS) information is generated by extracting a part or an entire NS message, the NS message having been generated to request a medium access control (MAC) address of a destination node. A modified route request (RREQ) message, including the NS information, is generated to request the MAC address of the destination node and a routing path to the destination node, and is broadcasted.

18 Claims, 7 Drawing Sheets

| OCTETS:1 | 1 | 1 | 1 | 1 | 1 | 4 | 6 | 4 |
|---|---|---|---|---|---|---|---|---|
| ID | LENGTH | MODE FLAGS | TTL | DESTINATION COUNT | HOP COUNT | RREQ ID | SOURCE ADDRESS | SOURCE SEQ. NUM. |

| 4 | 1 | | 6 | 4 | ... | 6 | 4 |
|---|---|---|---|---|---|---|---|
| METRIC | PER DESTINATION FLAGS DO #1 / RF #1 / RESERVED | | DESTINATION ADDRESS #1 | DESTINATION SEQ. NUM. #1 | | DESTINATION ADDRESS #N | DESTINATION SEQ. NUM. #N |

| 16 | 4 | 16 | 16 | 16 |
|---|---|---|---|---|
| DESTINATION IPv6 ADDRESS | DESTINATION SEQ. NUM. | SOURCE IPv6 ADDRESS | TARGET IPv6 ADDRESS | |

CONTROL MESSAGE PROCESSING METHOD IN WIRELESS MESH NETWORK AND CONTROL MESSAGE PROCESSING APPARATUS USING THE METHOD

CROSS-REFERENCE TO RELATED APPLICATION

This application claims the benefit under 35 USC 119(a) of Korean Patent Application No. 10-2006-0115347 filed on Nov. 21, 2006, in the Korean Intellectual Property Office, the entire disclosure of which is hereby incorporated by reference.

BACKGROUND OF THE INVENTION

1. Field of the Invention

The present invention relates to a wireless mesh network. More particularly, the present invention relates to a control message processing method in a wireless mesh network which can minimize unnecessary latency time or overhead occurring between multi-hop nodes.

2. Description of Related Art

A wireless network connection technology overcomes a limitation of a wired connection, which requires a terminal to be connected via a wire, and provides a ubiquitous network technology that can connect to a network at any time and any place. It is assumed that the ubiquitous network technology, which will be widely developed in the near future, will combine wired/wireless network technologies together and provide users with communication functionality without a limitation of a time and a place.

A wireless mesh network technology currently appears to be one of most appropriate network technologies. The wireless mesh network technology is already a developed network structure that interoperates over various existing wireless connection technologies and has been widely used to provide users with a wireless connection solution. Since the wireless mesh network technology has the advantages of the self-configuring and self-healing features of an ad-hoc network, the wireless mesh network technology can quickly build a network at a lower cost.

In comparison with a point-to-point communication and a point-to-multipoint communication of existing wireless communications, the wireless mesh network technology has the advantages of a reliable network and the expandability of a wireless network due to the wireless mesh network technology having a wired mesh type structure of a wired mesh type network in a wireless network. The wireless mesh network technology may be widely used in various fields such as next generation mobile communication, home networking, and special purpose networking used for public safety.

Various research is performed to build an enhanced mesh network in both academic and business fields.

However, in the wireless mesh network, a control message is required to flood when a medium access control (MAC) address of the destination node is required to acquire for communication between the multi hops, and also when a routing path to the destination node is required.

Even with the above mentioned advantages of the wireless mesh network, the wireless mesh network is required to acquire the MAC address of a destination node and build a routing path to the destination node for communication between multi-hop nodes, thus, complexity and inefficiency occur due to a feature of the wireless mesh network configured in multi-hops. The unnecessary latency time and overhead occurs due to a control message being flooded, which is generated to request the MAC address of the destination node and the routing path to the destination node.

Accordingly, there is a need for a control message processing method in a wireless mesh network which can minimize unnecessary latency time or overhead occurring between multi-hop nodes.

SUMMARY OF THE INVENTION

An aspect of exemplary embodiments of the present invention is to address at least the above problems and/or disadvantages to provide at least the advantages described below. Accordingly, an aspect of exemplary embodiments of the present invention is to provide a control message processing method and a control message processing apparatus using the method which can minimize unnecessary latency and overhead occurring between multi-hop nodes by requesting a MAC address of a destination node and a routing path to the destination node, required for communication between multi-hop nodes, in a single control message.

According to an aspect of exemplary embodiments of the present invention, there is provided a control message processing method including: generating neighbor solicitation (NS) information by extracting a part of or an entire NS message, the NS message having been generated to request a MAC address of a destination node; generating a modified route request (RREQ) message, including the NS information, to request the MAC address of the destination node and a routing path to the destination node; and broadcasting the modified RREQ message.

According to another aspect of exemplary embodiments of the present invention, there is provided a control message processing method including: generating neighbor advertisement (NA) information by extracting a part or an entire NA message, the NA message having been generated to request a MAC address of a destination node; generating a modified route reply (RREP) message, including the NA information, to offer the MAC address of the destination node and a routing path to the destination node; and broadcasting the modified RREP message.

According to another aspect of exemplary embodiments of the present invention, there is provided a control message processing apparatus including: an extractor generating NS information by extracting a part or an entire NS message, the NS message being generated to request a MAC address of a destination node; a generation module generating a modified RREQ message, including the NS information, to request the MAC address of the destination node and a routing path to the destination node; and a transmission module broadcasting the modified RREQ message.

According to another aspect of exemplary embodiments of the present invention, there is provided a control message processing apparatus including: an extractor generating NS information by extracting a part or an entire NA message, the NA message being generated to request a MAC address of a destination node; a generation module generating a modified RREP message, including the NA information, to offer the MAC address of the destination node and a routing path to the destination node; and a transmission module broadcasting the modified RREP message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
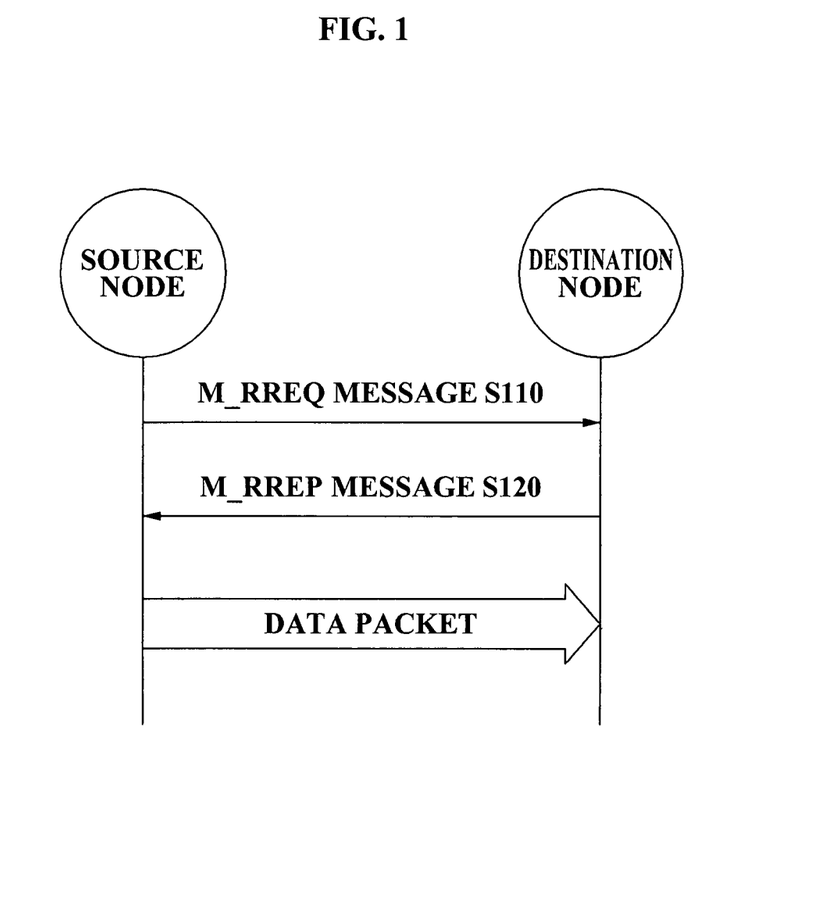
FIG. 1 is a first flowchart illustrating a control message processing method in a wireless mesh network according to an exemplary embodiment of the present invention.

FIG. 1 is a first flowchart illustrating a control message processing method in a wireless mesh network according to an exemplary embodiment of the present invention.

As illustrated in FIG. 1, the control message processing method in the wireless mesh network according to the exemplary embodiment of the present invention may include a source node broadcasting a modified route request (M_RREQ) message for communication between multi-hop nodes in operation S110, and a destination node unicasting a modified route reply (M_RREP) message in operation S120.

The source node generates the M_RREQ message, requesting a medium access control (MAC) address with respect to an Internet protocol (IP) address of the destination node, and a routing path to the destination node, and broadcasts the M_RREQ message.

The destination node generates the M_RREP message providing the MAC address of the destination node and the routing path to the destination node in response to the M_RREQ message, and unicasts the M_RREP message.

Operation of the broadcasting of the M_RREQ message in the source node will be described by referring to FIGS. 2 and 3.

Figure 2:
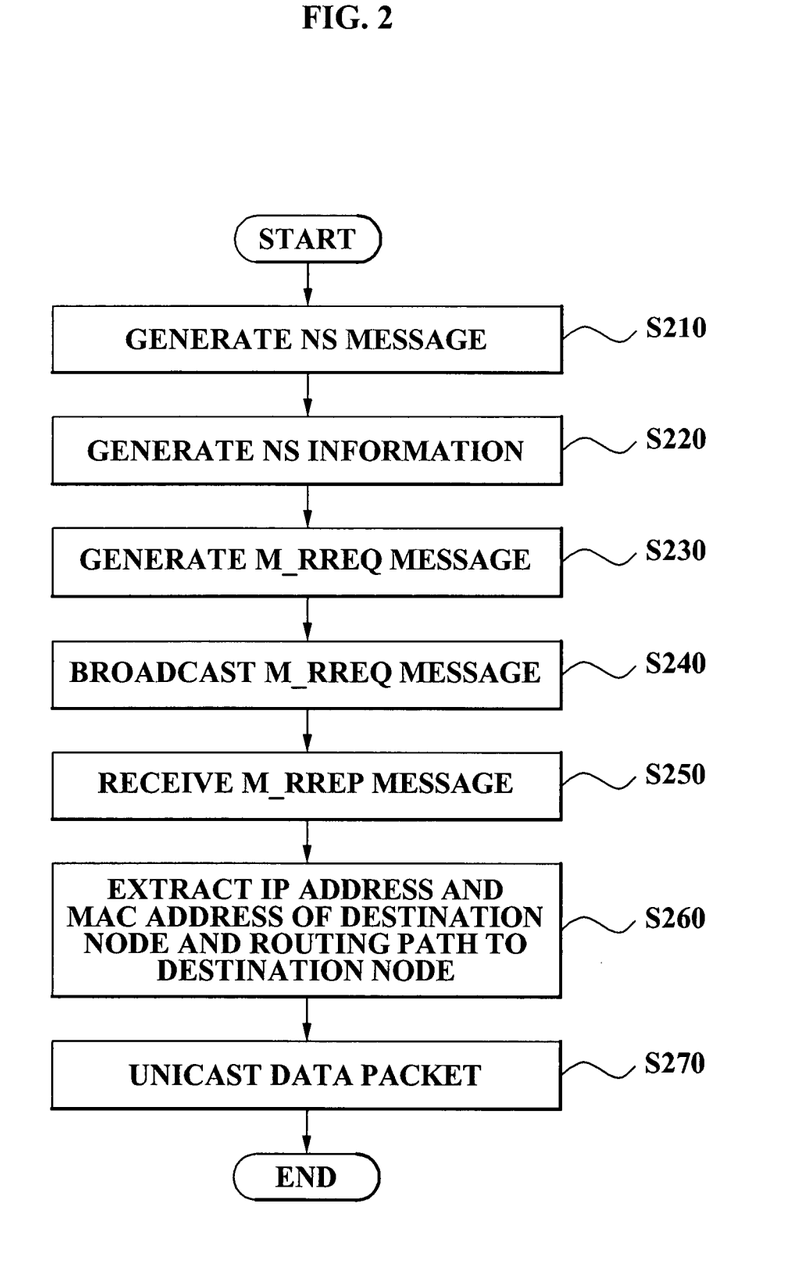
FIG. 2 is a flowchart illustrating a control message processing method in a source node according to an exemplary embodiment of the present invention.

As illustrated in FIG. 2, a control message processing method in a source node, according to an exemplary embodiment of the present invention, includes generating a neighbor solicitation (NS) message in operation S210, generating NS information in operation S220, generating a M_RREQ message in operation S230, broadcasting the M_RREQ message in operation S240, receiving a M_RREP message in operation S250, extracting an IP address of a destination node, a MAC address of the destination node, and a routing path to the destination node in operation S260, and unicasting a data packet in operation S270. In this case, the NS message indicates an Internet control message protocol version 6 (ICMPv6) NS message for a neighbor discovery protocol.

Hereinafter, the control message processing method in the source node according to the exemplary embodiment of the present invention will be described in detail.

The source node generates the NS message to request the MAC address of the destination node in operation S210, and generates NS information by extracting a part or an entire NS message in operation S220. In this case, the NS information is information to request the MAC address of the destination node, and may include information corresponding to a destination address field, a source address field, and a target address field.

In this case, the source node may store the generated NS information in a memory, and a purpose for storing the generated NS information in the memory by the source node will be described later.

The source node generates a M_RREQ message to request the MAC address of the destination node and the routing path to the destination node, including the generated NS information in operation S230.

Consequently, the source node may broadcast the generated M_RREQ message in operation S240, and a format of the generated M_RREQ message will be described by referring to FIG. 3.

Figure 3:
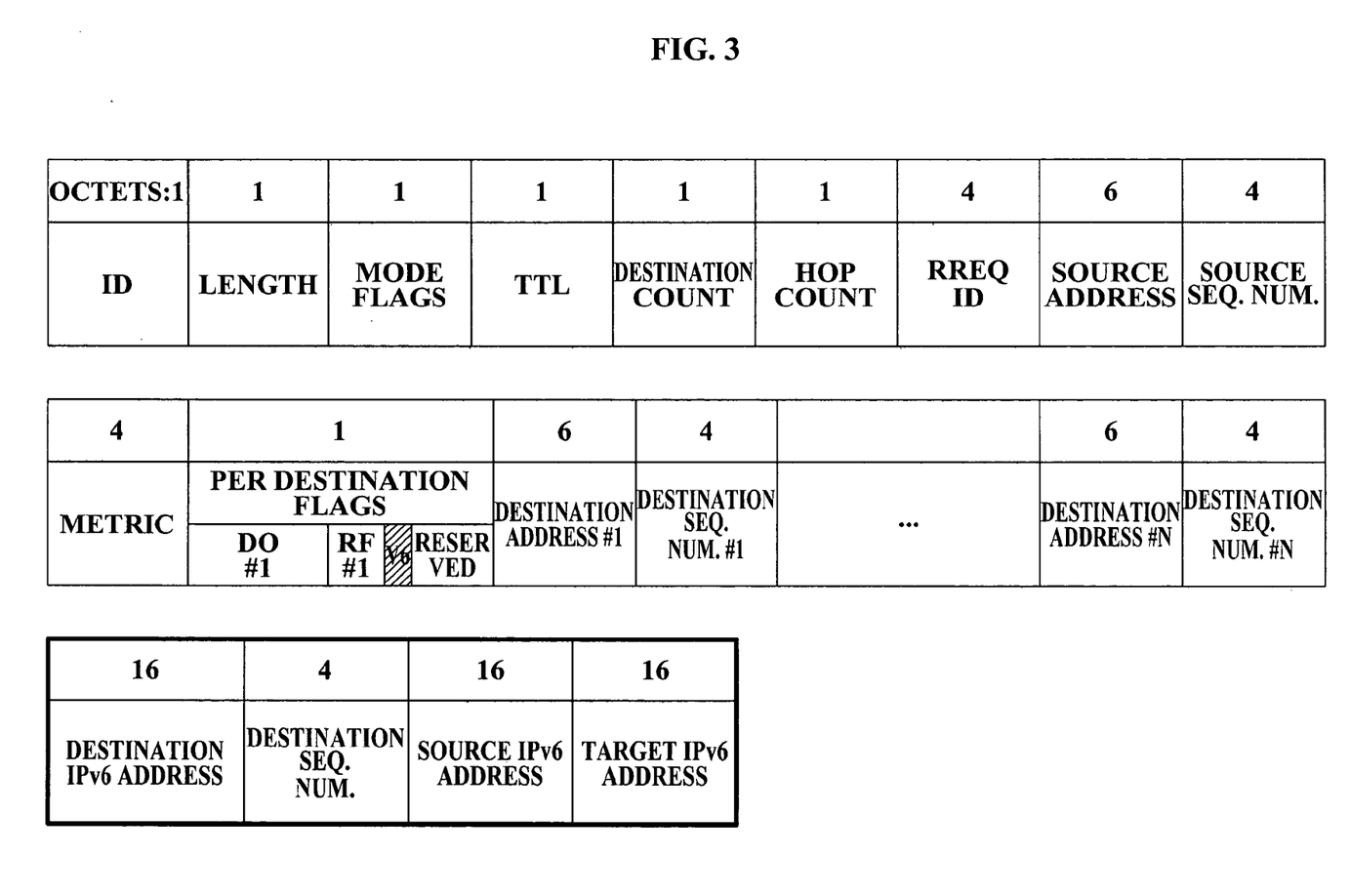
FIG. 3 is a diagram illustrating a format of a M_RREQ message according to an exemplary embodiment of the present invention.

FIG. 3 is a diagram illustrating a format of a M_RREQ message according to an exemplary embodiment of the present invention.

As illustrated in FIG. 3, the M_RREQ message according to the exemplary embodiment of the present invention may additionally add a destination address indicating an IP address of a destination node, a source address field indicating an IP address of a source node, and a target address field indicating the IP address of the destination node to an RREQ message including an identifier (ID) field, a length field, a mode flags field, a time to live (TTL) field, a destination count field, a hop count field, an RREQ ID field, a source address field indicating a MAC address of a source node, a source sequence number field, a metric field, a destination flag field for broadcasting, a destination address field indicating a MAC address of a destination node, and a destination sequence number field.

In this case, the destination flag field includes a destination only (DO) field, a reply and forward (RF) field, and a reserved field, and the DO field is always in an on mode in order to reply only in the destination node using a M_RREP message, when receiving the M_RREQ message. Also, the V6 field, indicating a message requesting the MAC address of the destination node, may be additionally added.

Later, when the destination node receives the M_RREQ message, the M_RREP message may be generated in response to the received M_RREQ message. Hereinafter, an operation of the unicasting of the generated M_RREP message in the destination node will be described by referring to FIGS. 4 through 6.

Figure 4:
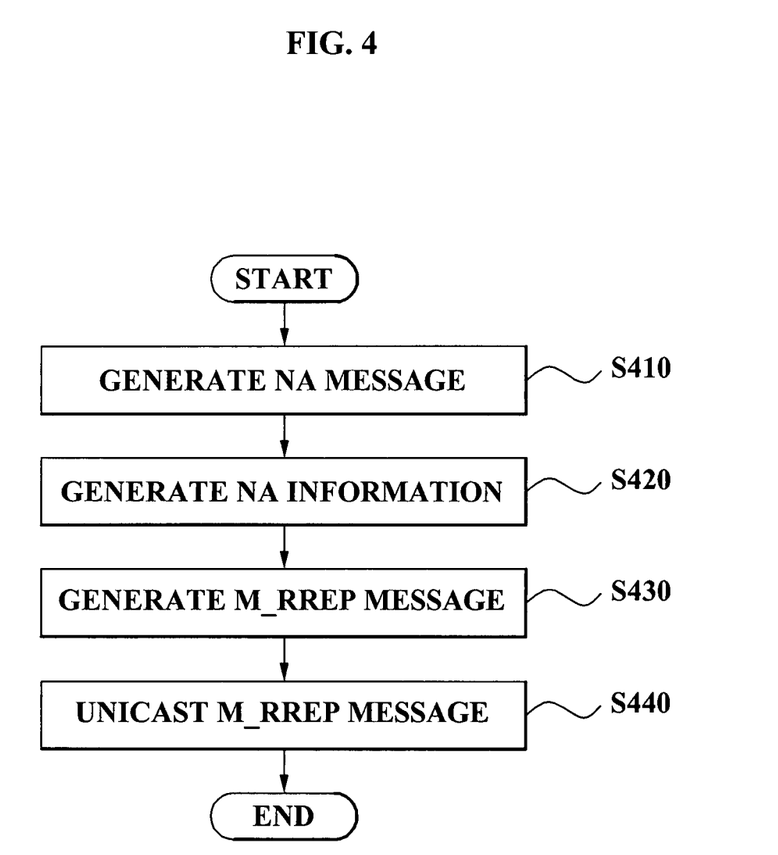
FIG. 4 is a flowchart illustrating a control message processing method in a destination node according to an exemplary embodiment of the present invention.

FIG. 4 is a flowchart illustrating a control message processing method in a destination node according to an embodiment of the present invention.

As illustrated in FIG. 4, the control message processing method in the destination node according to the embodiment of the present invention may include generating a neighbor advertisement (NA) message in operation S410, generating NA information in operation S420, generating a M_RREP message in operation S430, and unicasting the M_RREP message in operation S440. In this case, the NA message indicates an ICMPv6 NS message for a neighbor discovery protocol.

The control message processing method in the destination node according to the embodiment of the present invention is as follows.

The destination node generates the NA message when the destination node receives a M_RREQ message in operation S410, and the destination node generates necessary NA information for providing a MAC address of the destination node by extracting a part or the entire generated NA message, that is, an IP address of the source node and an IP address of the destination node, in operation S420.

The destination node generates the M_RREP message, including the generated NA information, for providing the MAC address of the destination node and a routing path to the destination node in operation S430.

Consequently, the destination node may unicast the generated M_RREP message in operation S440, and a format of the generated M_RREP message will be described by referring to FIG. 5.

Figure 5:
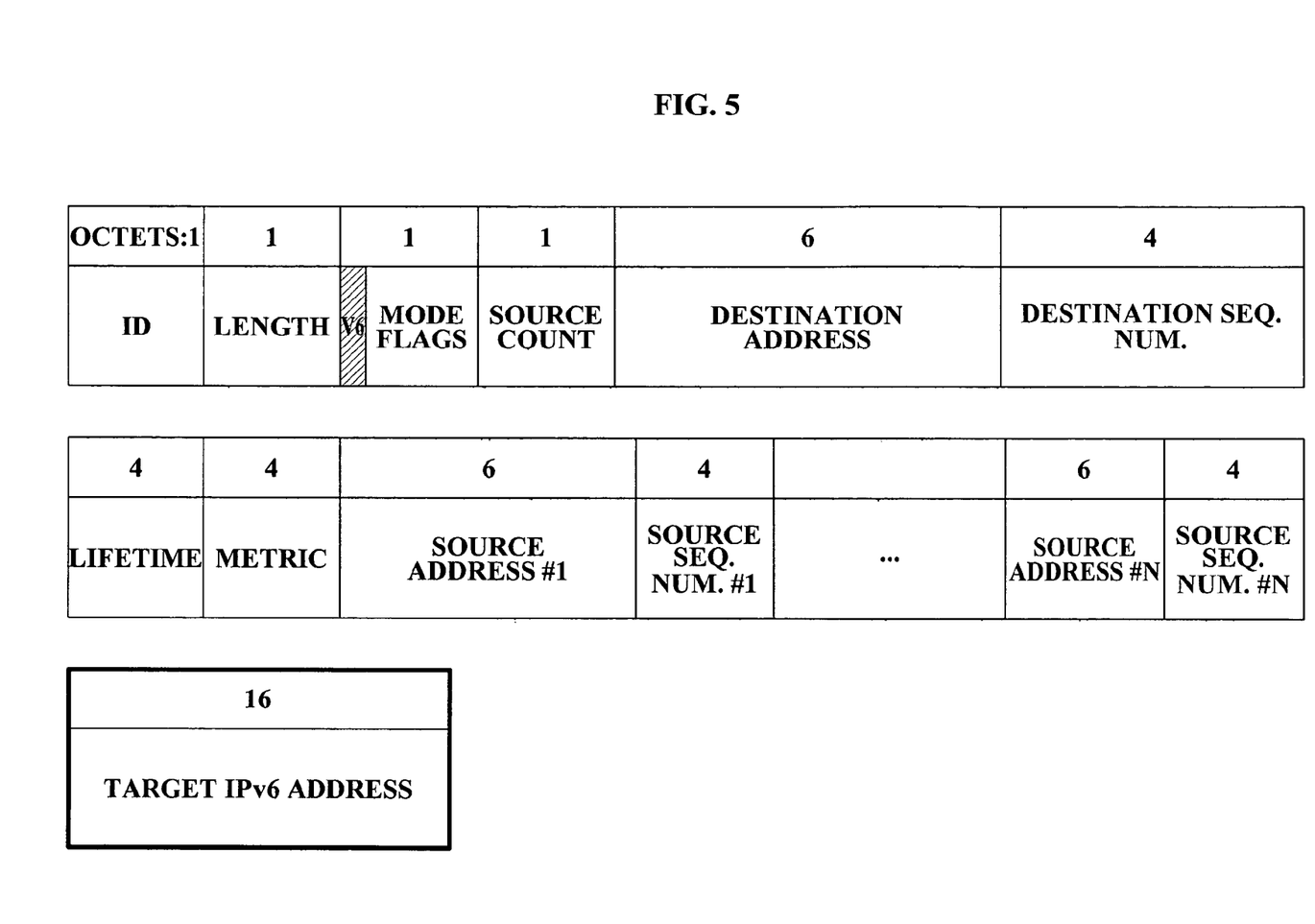
FIG. 5 is a diagram illustrating a format of a M_RREP message according to an exemplary embodiment of the present invention.

FIG. 5 is a diagram illustrating a format of a M_RREP message according to an embodiment of the present invention.

As illustrated in FIG. 5, the M_RREP message according to the exemplary embodiment of the present invention adds a target address field indicating an IP address of the destination node to the RREP message, the RREP message including an ID field, a length field, a mode flag field, a source count field, a destination address field indicating the MAC address of a destination node, a destination sequence number field, a lifetime field, a metric field, a source address field indicating the MAC address of the source node for unicasting, and a source sequence number field.

In this case, the mode flag field is a type of a reserved field, and the V6 field indicating a message for providing the MAC address of the destination node may be additionally added.

Figure 6:
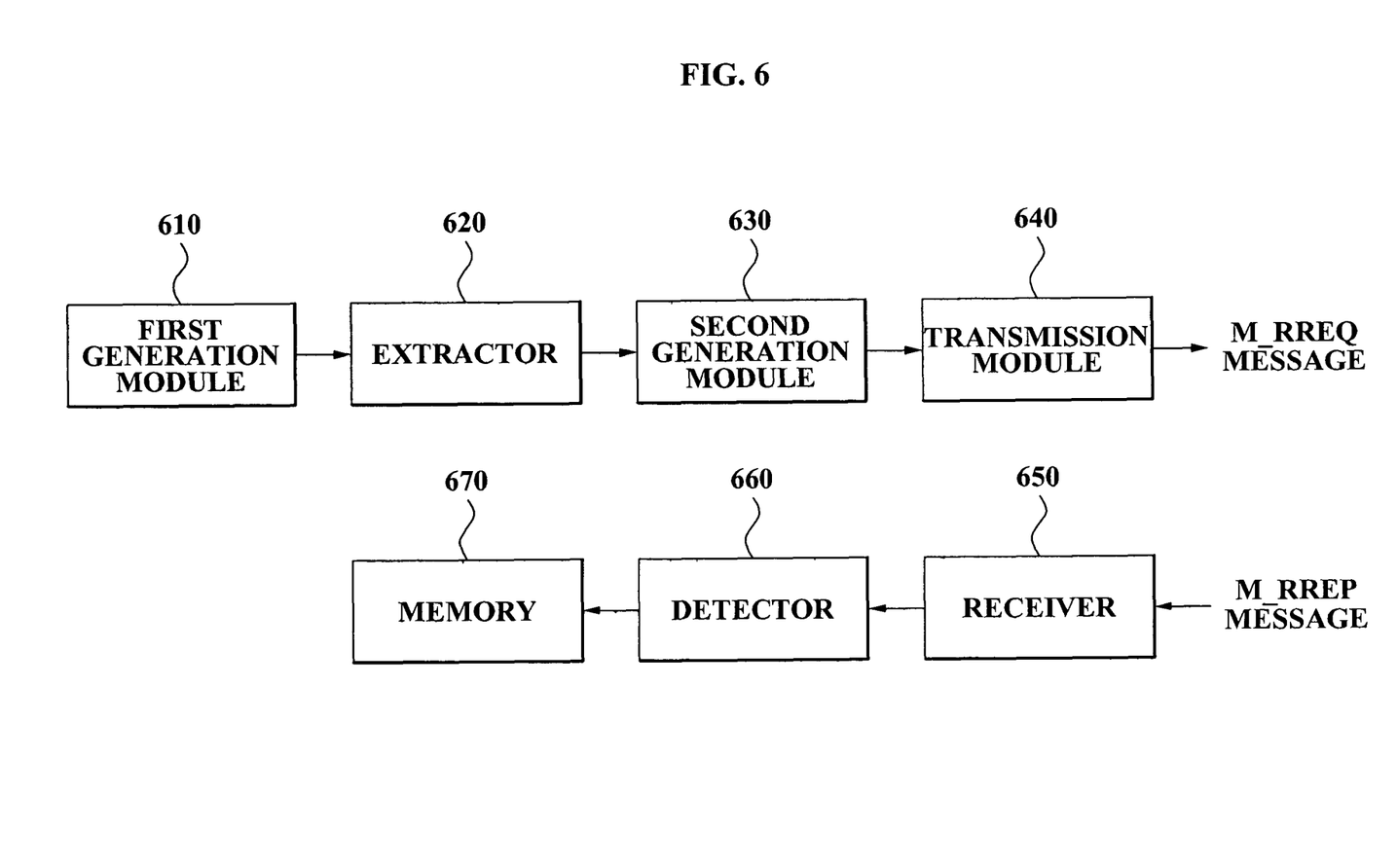
FIG. 6 is a block diagram illustrating a control message processing node in a wireless mesh network according to an exemplary embodiment of the present invention.

FIG. 6 is a block diagram illustrating a control message processing node in a wireless mesh network according to an exemplary embodiment of the present invention.

As illustrated in FIG. 6, the control message processing node in the wireless mesh network according to the exemplary embodiment of the present invention may include a first generation module 610, an extractor 620, a second generation module 630, a transmission module 640, a receiver 650, a detector 660, and a memory 670. In this case, the control message processing node is a type of apparatus capable of processing a control message, and may be included in a source node, an intermediate mode, and a destination node.

In the source node generating a M_RREQ message, the first generation module 610 generates a NS message, and the extractor 620 generates NS information by extracting a part or the entire generated NS message.

The second generation module 630 generates a M_RREQ message, including the generated NS information, to request the MAC address of the destination node and a routing path to the destination node.

The transmission module 640 broadcasts the M_RREQ message, and the receiver 650 receives an M_RREP message.

The detector 660 detects the MAC address of the destination node and the routing path to the destination node from the received M_RREP message. The memory 670 stores the MAC address of the destination node and the routing path to the destination node detected from the detector 660.

In the destination node generating the M_RREP message, the first generation module 610 generates a NA message for providing the MAC address of the destination node, and the extractor 620 generates NA information by extracting a part or the entire generated NA message.

The second generation module 630 generates the M_RREP message, including the NA information, for providing the MAC address of the destination node and the routing path to the destination node.

Later, the source node receives the M_RREP message of a unicast message in response to the M_RREQ message in operation S250.

The source node detects the MAC address of the destination node and the routing path to the destination node from the M_RREP message in operation S260. Consequently, the source node may unicast a data packet to the destination node based on the detected MAC address of the destination node and the routing path to the destination node in operation S270.

The source node operates a timer to measure a response time by broadcasting the generated M_RREQ message. The response time is measured because the destination node may not interpret the M_RREQ message even when the destination node receives the M_RREQ message and may allow for the source node to be dynamically established with its response time, such as one second, depending on a network condition.

The source node checks whether the response time exceeds a predetermined time. Namely, the source node may detect the MAC address of the destination node and the routing path to the destination node when the M_RREP message is received prior to the response time exceeding the predetermined time.

Conversely, the source node may detect the MAC address of the destination node and the routing path to the destination node by transmitting/receiving a control message according to an existing method when the M_RREP message is not received before the response time exceeds the predetermined time, and this will be described by referring to FIG. 7.

Figure 7:
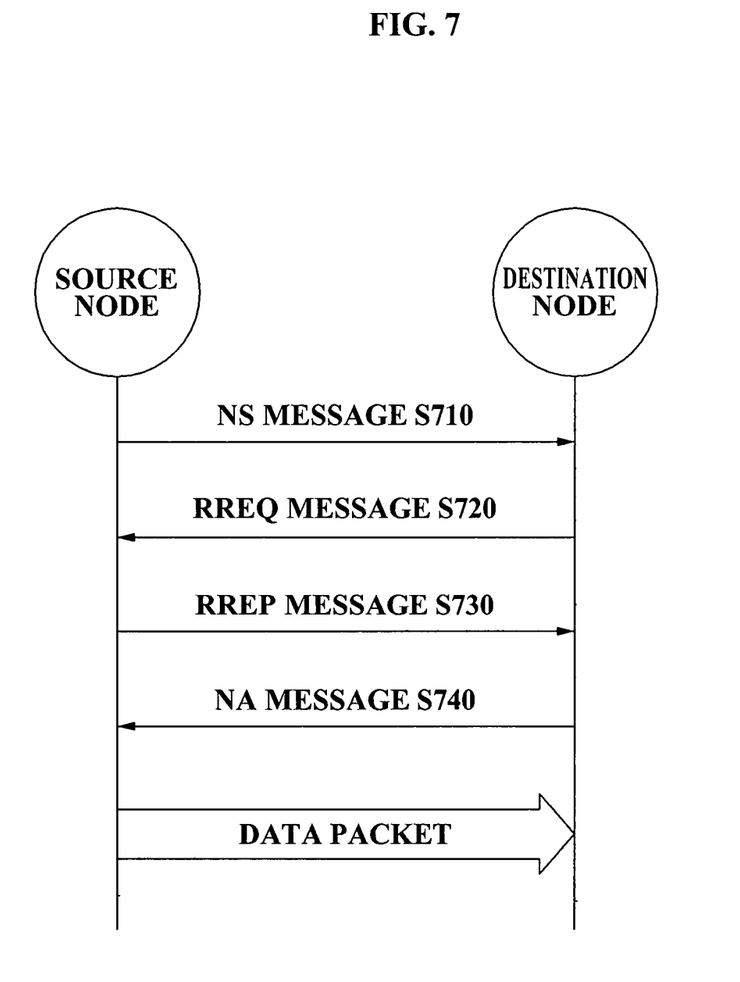
FIG. 7 is a second flowchart illustrating a control message processing method in a wireless mesh network according to an exemplary embodiment of the present invention.

FIG. 7 is a second flowchart illustrating a control message processing method in a wireless mesh network according to an exemplary embodiment of the present invention.

As illustrated in FIG. 7, a source node multicasts a NS message for requesting a MAC address of a destination node in operation S710, and the destination node broadcasts an RREQ message in operation S720 when the destination node receives the NS message. In this case, the RREQ message is broadcasted to detect a routing path for transmitting a NA message in response to the NS message.

When the source node receives the RREQ message, an RREP message may be unicasted in response to the received RREQ message in operation S730. Namely, the source node may detect the routing of the destination node from the RREQ message.

When the destination node receives the RREP message, the NA message may be unicasted via information of the detected routing path by detecting the routing path from the received RREP message in operation S740.

Consequently, the source node may unicast a data packet to the destination node based on information of the detected MAC address and the routing path by detecting the MAC address of the destination node from the received NA message.

The control message processing method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like through the Internet via wired or wireless transmission paths. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention. The computer-readable recording media can also be distributed over network-coupled computer systems so that the computer-readable code is stored and executed in a distributed fashion.

As described above, a control message processing method and a control message processing apparatus using the method in a wireless mesh network according to an exemplary embodiment of the present invention can minimize unnecessary latency occurring between multi-hop nodes by requesting a MAC address of a destination node and a routing path to the destination node, required for communication between the multi-hop nodes, in a single control message.

Also, the control message processing method and a control message processing apparatus using the method in a mesh network according to an exemplary embodiment of the present invention can minimize unnecessary overhead occurring between multi-hop nodes of a destination node, by requesting a MAC address of the destination node and a routing path to the destination node, required for communication between the multi-hop nodes, in a single control message.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A control message processing method of a source node to reduce overhead in a network, the method comprising:
   generating extracted neighbor solicitation (NS) information by extracting at least a portion of a NS message that is generated to request a medium access control (MAC) address of a destination node;
   generating a modified route request (RREQ) message by inserting the extracted NS information into a RREQ message, to request the MAC address of the destination node and a routing path to the destination node with a single message; and
   broadcasting the modified RREQ message,
   wherein the broadcasting of the modified RREQ message comprises measuring a response time by broadcasting the modified RREQ message and operating a timer.

2. The method of claim 1, wherein the NS message comprises an Internet control message protocol version 6 (ICMPv6) NS message for a neighbor discovery protocol.

3. The method of claim 1, wherein the generating of the modified RREQ message comprises adding, to the RREQ message, a V6 (Version 6) field indicating a message requesting the MAC address of the destination node, or a destination address field indicating an Internet Protocol (IP) address for broadcast, or a source address field indicating an IP address of a source node, or a target address field indicating the IP address of the destination node, or any combination thereof.

4. The method of claim 1, further comprising:
   receiving a modified route reply (RREP) message of a unicast message in response to the modified RREQ message;
   detecting, from the modified RREP message, the MAC address of the destination node and the routing path to the destination node; and
   transmitting a data packet based on the MAC address of the destination node and the routing path to the destination node.

5. The method of claim 4, further comprising:
   performing the detecting of the MAC address in response to the modified RREP message being received before the response time exceeds a time period; and
   multicasting the generated NS message in response to the modified RREP message not being received before the response time exceeds the time period.

6. The method of claim 4, wherein the modified RREP message comprises a V6 field indicating a message providing the MAC address of the destination node, which is added to an RREP message, and a target address field, indicating an IP address of the destination node, which is added to the RREP message.

7. The method of claim 4, further comprising storing the MAC address of the destination node and the routing path to the destination node.

8. A control message processing method of a destination node to reduce overhead in a network, the method comprising:
   receiving a modified route request (RREQ) message comprising NS information, the modified RREQ message requesting a MAC (Medium Access Control) address of the destination node and a routing path to the destination node;
   in response to receiving the modified RREQ message, generating extracted neighbor advertisement (NA) information by extracting at least a portion of a NA message that comprises the MAC address of the destination node;
   generating a modified route reply (RREP) message by inserting the extracted NA information into a RREP message, the modified RREP message comprising the MAC address of the destination node and the routing path to the destination node in a single message; and
   unicasting the modified RREP message, wherein the modified RREQ message is broadcasted from a source node that measures a response time by broadcasting the modified RREQ message and operating a timer.

9. The method of claim 8, wherein the NA message comprises an Internet control message protocol version 6 (ICMPv6) NA message for a neighbor discovery protocol.

10. A non-transitory computer-readable storage medium storing a program comprising instructions to cause a computer to perform a control message processing method of a source node to reduce overhead in a network, the method comprising:
    generating extracted neighbor solicitation (NS) information by extracting at least a portion of a NS message that is generated to request a medium access control (MAC) address of a destination node;
    generating a modified route request (RREQ) message by inserting the extracted NS information into a RREQ message, to request the MAC address of the destination node and a routing path to the destination node with a single message; and broadcasting the modified RREQ message, wherein the broadcasting of the modified RREQ message comprises measuring a response time by broadcasting the modified RREQ message and operating a timer.

11. A control message processing apparatus to reduce overhead in a network, the apparatus comprising:
- an extractor configured to generate extracted neighbor solicitation (NS) information by extracting at least a portion of a NS message that is generated to request a medium access control (MAC) address of a destination node;
- a generation module configured to generate a modified route request (RREQ) message by inserting the extracted NS information into a RREQ message, to request the MAC address of the destination node and a routing path to the destination node with a single message; and
- a transmission module configured to broadcast the modified RREQ message, and measure a response time by broadcasting the modified RREQ message and operating a timer.

12. The apparatus of claim 11, wherein the NS message comprises an Internet control message protocol version 6 (ICMPv6) NS message for a neighbor discovery protocol.

13. The apparatus of claim 12, wherein the generation module is configured to add, to the RREQ message, V6 (Version 6) field indicating a message requesting the MAC address of the destination node, or a destination address field indicating an Internet Protocol (IP) address for broadcast, or a source address field indicating an IP address of a source node, or a target address field indicating the IP address of the destination node, or any combination thereof.

14. The apparatus of claim 11, further comprising:
- a receiver configured to receive a modified route reply (RREP) message of a unicast message in response to the modified RREQ message; and
- a detector configured to detect, from the modified RREP message, the MAC address of the destination node and about the routing path to the destination node.

15. The apparatus of claim 14, wherein the modified RREP message comprises a V6 field indicating a message providing the MAC address of the destination node, which is added to an RREP message, and a target address field indicating an IP address of the destination node, which is added to the RREP message.

16. The apparatus of claim 14, further comprising a memory configured to store the MAC address of the destination node and the routing path to the destination node.

17. A destination node comprising:
- a receiver configured to receive a modified route request (RREQ) message comprising NS information, the modified RREQ message requesting a MAC address (Medium Access Control) of the destination node and a routing path to the destination node;
- an extractor configured to generate neighbor advertisement (NA) information, in response to receiving the modified RREQ message, by extracting at least a portion of a NA message that comprises the MAC address of the destination node;
- a generation module configured to generate a modified route reply (RREP) message by inserting the extracted NA information into a RREP message, the modified RREP message comprising the MAC address of the destination node and the routing path to the destination node in a single message; and
- a transmission module configured to unicast the modified RREP message,
- wherein the modified RREQ message is broadcasted from a source node that measures a response time by broadcasting the modified RREQ message and operating a timer.

18. The destination node of claim 17, wherein the NA message comprises an Internet control message protocol version 6 (ICMPv6) NA message for a neighbor discovery protocol.

* * * * *